United States Patent
Elsbernd et al.

(10) Patent No.: US 6,697,804 B1
(45) Date of Patent: *Feb. 24, 2004

(54) DEPLOYING PLURALITY OF SANPSHOTS STORING PARAMETERIZED DATA DESCRIPTION LANGUAGE STRINGS WITH SUBSTITUTABLE PARAMETER CAUSES DATABASE OBJECT TO INSTANTIATED

(75) Inventors: Curtis Elsbernd, Belmont, CA (US); Benny Souder, Belmont, CA (US); Wayne E. Smith, Palo Alto, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/293,555

(22) Filed: Nov. 14, 2002

Related U.S. Application Data (62) Division of application No. 09/321,625, filed on May 28, 1999, now Pat. No. 6,529,904.
(60) Provisional application No. 60/086,985, filed on May 28, 1998.

(51) Int. Cl.[7] ................................................ G06F 17/30
(52) U.S. Cl. ...................... 707/6; 707/1; 707/2; 707/4; 707/5; 707/100; 707/102; 707/104.1
(58) Field of Search .................. 707/1–10, 100–104, 707/204–205, 104.1; 711/160–175; 709/225–240; 345/665–666

(56) References Cited

U.S. PATENT DOCUMENTS

| | | | |
|---|---|---|---|
| 4,631,673 A | 12/1986 | Haas | |
| 5,375,237 A | * 12/1994 | Tanaka et al. | ............... 707/102 |
| 5,418,966 A | 5/1995 | Madduri | |
| 5,440,735 A | 8/1995 | Goldring | |
| 5,452,448 A | 9/1995 | Sakurabe et al. | |
| 5,459,860 A | 10/1995 | Burnett et al. | |
| 5,553,279 A | 9/1996 | Goldring | |
| 5,603,024 A | 2/1997 | Goldring | |
| 5,606,699 A | * 2/1997 | De Pauw et al. | ........... 709/315 |
| 5,613,113 A | 3/1997 | Goldring | |
| 5,706,509 A | 1/1998 | Man-Hak Tso | |
| 5,732,262 A | * 3/1998 | Gillespie et al. | ............ 707/102 |
| 5,737,601 A | 4/1998 | Jain et al. | |
| 5,761,493 A | 6/1998 | Blakely et al. | |
| 5,794,030 A | 8/1998 | Morsi et al. | |
| 5,799,306 A | 8/1998 | Sun et al. | |
| 5,806,074 A | 9/1998 | Souder | |
| 5,806,075 A | 9/1998 | Jain et al. | |
| 5,870,759 A | 2/1999 | Bauer et al. | |
| 5,870,765 A | 2/1999 | Bauer et al. | |
| 5,926,816 A | 7/1999 | Bauer et al. | |

(List continued on next page.)

OTHER PUBLICATIONS

Anisora et al., "the complex substitution algorithm for view synchronization", computer science technical report series, WPI–CS TR–97–8, Sep. 1997.*

(List continued on next page.)

Primary Examiner—Srirama Channavajjala
(74) Attorney, Agent, or Firm—Ditthavong & Carlson, P.C.

(57) ABSTRACT

Mass deployment of snapshots is fostered by allowing collections of snapshots, called refresh groups, to be defined by a template. The template allows for a parameterized snapshot definition query or other DDL text to be defined, so that user-specific or site-specific values can be substituted into parameters to create different objects. Furthermore, off-line instantiation of snapshots is provided, so that the data for an entire suite of front office applications can be stored. on a floppy disk, magnetic disk, CD ROM, or other transportable computer-readable medium.

14 Claims, 6 Drawing Sheets

U.S. PATENT DOCUMENTS

| | | | |
|---|---|---|---|
| 5,956,728 A | * | 9/1999 | Federighi et al. ....... 707/103 R |
| 5,963,959 A | | 10/1999 | Sun et al. |
| 5,995,980 A | | 11/1999 | Olson et al. |
| 5,999,936 A | | 12/1999 | Pattison et al. |
| 6,006,232 A | | 12/1999 | Lyons |
| 6,038,639 A | * | 3/2000 | O'Brien et al. ............. 711/114 |
| 6,115,704 A | * | 9/2000 | Olson et al. .................... 707/3 |
| 6,151,602 A | | 11/2000 | Hejlsberg et al. |
| 6,272,502 B1 | | 8/2001 | Lieuwen et al. |
| 6,289,335 B1 | | 9/2001 | Downing et al. |
| 6,366,294 B1 | * | 4/2002 | Cunningham et al. ...... 345/666 |
| 6,401,101 B1 | * | 6/2002 | Britton et al. .......... 707/103 X |
| 6,529,904 B1 | * | 3/2003 | Elsbernd et al. ................ 707/8 |
| 6,532,479 B2 | * | 3/2003 | Souder et al. .............. 707/201 |

OTHER PUBLICATIONS

HK Kuno et al., Materialized object–oriented views in Multiview, 1995 pp 1–8.*

Consultative committee for space data systems, report concerning space data system standards, the data description language east–list of conventions, CCSDS 646.0–G–1, Greene Book, May 1997, pp 1–12.*

Eric N. Hanson, A Performance Analysis of View Materialization Strategies, Association for computing machinery special interest group on Management of data 1987 annual conference, San Francisco, May 27–29, 1987, vol 16, No. 3 Sigmod Record, Dec. 1987, pp 440–453.

* cited by examiner

DEPLOYING PLURALITY OF SANPSHOTS STORING PARAMETERIZED DATA DESCRIPTION LANGUAGE STRINGS WITH SUBSTITUTABLE PARAMETER CAUSES DATABASE OBJECT TO INSTANTIATED

RELATED APPLICATIONS

The present application is a divisional of U.S. patent application Ser. No. 09/321,625 filed on May 28, 1999, now U.S. Pat. No. 6,529,904, and claims the benefit of U.S. Provisional Application No. 60/086,985 entitled "Replication for Front Office Replication" filed on May 28, 1998 by Benny Souder, Alan Downing, Harry Sun, Alan Demers, James Stamos, John Graham, and Curtis Elsbernd, the contents of both of which are hereby incorporated by reference herein.

U.S. application Ser. No. 09/322,152, entitled "Data Replication for Front Office Automation" filed on May 28, 1999 by Benny Souder, Alan Downing, Harry Sun, Alan Demers, James Stamos, John C. Graham, Curtis Elsbernd, Mahesh Subramaniam, and Wayne E. Smith, now U.S. Pat. No. 6,532,479;

U.S. application Ser. No. 09/322,622 entitled "Lightweight Data Replication" filed on May 8, 1999 by Sukanya Balaraman, Alan Downing, John C. Graham, Lewis S. Kaplan, Benny Souder, and Harry Sun;

U.S. application Ser. No. 09/321,624 is now pending entitled "Data Replication Security" filed on same date herewith by Wayne E. Smith and Alan Downing; and U.S. application Ser. No. 09/321,594 is now pending entitled "Schema Evolution in Replication" filed on May 28, 1999 by Alan Demers, Curtis Elsbemd, James Stamos, and Lik Wong.

FIELD OF THE INVENTION

The present invention relates to distributed database systems and more particularly to a method and article for mass deployment of front office applications using distributed database technology.

BACKGROUND OF THE INVENTION

Under certain conditions, it is desirable to have copies of a particular body of data, such as a relational database table, at multiple sites. The mechanism for maintaining multiple copies of the same body of data at multiple sites is generally referred to as "data replication." In a distributed database system using data replication, multiple replicas of data exist in more than one database in the distributed database system.

One kind of data replication employs snapshots. A snapshot is a body of data constructed of data from one or more "master" tables, views, or even other snapshots, any of which can be stored locally or remotely relative to the snapshot. The data contained within the snapshot is defined by a query that references one or more master tables (and/or other database objects) and reflects the state of its master tables at a particular point in time. To bring the snapshot up-to-date with respect to the master tables, the snapshot is refreshed upon request, e.g. at a user's command or automatically on a periodic, scheduled basis.

There are two basic approaches for refreshing a snapshot. "Complete refreshing" involves reissuing the defining query for the snapshot and replacing the previous snapshot with the results of the reissued query. "Incremental refresh" or "fast refresh" refers to identifying the changes that have happened to the master tables (typically, by examining a log file of the changes) and transferring only the data for the rows in the snapshot that have been affected by the master table changes. An "updatable snapshot" is a snapshot to which updates may be directly made, which are propagated from the snapshot back to the master table before refreshing.

Traditionally, snapshots have been implemented for high-end computer systems, which are characterized by the use of high performance computers that are interconnected to one another by highly reliable and high bandwidth network links. Typically, highly experienced database administrators manage these high-end systems. Due to the expense of these high-end computers, high-end distributed systems tend to involve a small number of networked sites, whose users can be trusted at least in part because of the physical security of the computers.

Recently, there has been much interest in the marketplace for applications for front office automation. One example is sales force automation, where hundreds, if not thousands, of sales representatives in a company are given laptops to improve their productivity. The laptops are loaded with applications, for example, to help a sales representative sell the company's products to a customer and take the customer's order. Therefore, the laptops include a data store to keep the customer and order information handy for use by a specific sales representative.

Front office automation, however, challenges the operating assumptions behind the high-end snapshot implementations. For example, laptops are not high-performance computer systems and are only sporadically connected to a master site, typically for short periods of time. Moreover, laptops can get or stolen, raising security concerns. In addition, it is difficult to deploy a large number of front office applications with many different snapshots. Therefore, implementing a high-end snapshot replication approach for front-office automation incurs a number of disadvantages that, if not addressed, render the use of snapshots problematic for front office automation.

Mass deployment of front office applications and the data to support them is another difficult issue when there are hundreds, if not thousands, of laptops functioning as client sites. Since the snapshot metadata is stored at the client site in the high-end approach, the snapshots for the front office applications have to be individually instantiated by a person at the laptop, when the laptop is connected to the master site. The typical sales representative, however, does not have the training to perform this operation. Moreover, instantiating these snapshots is especially time-consuming when done over a low bandwidth connection.

SUMMARY OF THE INVENTION

There is a need for an implementation of mass deployment of snapshots that is suitable in a front office automation environment without incurring the above-described and other disadvantages incumbent in a high-end implement of snapshot replication.

This and other needs are addressed by the present invention in which mass deployment of snapshots is fostered by allowing collections of snapshots, called refresh groups, to be defined by a template. The template allows for a parameterized snapshot definition query or other Data Definition Language (DDL) or Data Manipulation Language (DML) statement to be defined, so that user-specific values can be substituted into parameters to create different objects. Furthermore, off-line instantiation of snapshots is provided, so that the data for an entire suite of front office applications can be stored on a floppy disk, magnetic disk, CD ROM, or other transportable computer-readable medium. This computer-readable medium is capable of being applied to a laptop, for example by insertion into a CD ROM drive, so that an installation program can install the requisite snapshots without the intervention required of an experienced database administrator.

Accordingly, one aspect of the invention relates to a computer-implemented method and a computer-readable medium bearing instructions for deploying a database object such as a relational database table, index, snapshot, view, materialized view, etc. The methodology includes storing a string that describes how to instantiate the database object and inspecting the string to determine if the string includes a substitutable parameter. If there is a substitutable parameter, a value is obtained for the substitutable parameter, and that value is substituted value for the substitutable parameter to produce a DDL text, which, when executed, causes the database object to be instantiated.

Another aspect of the invention pertains to a computer-implemented method and a computer-readable medium bearing instructions for deploying a plurality of snapshots. A refresh group is defined, listing the snapshots. Corresponding strings, each including at least one substitutable parameter, are stored that describe how to instantiate the snapshots. After a value for the substitutable parameter is obtained, the value is substituted for the substitutable parameter in each of the strings to produce a Data Description Language (DDL) text for each snapshot, which, when executed, causes the snapshots to be instantiated. In one embodiment, the DDL texts are stored on a transportable, computer-readable medium.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, article, and apparatus for mass deployment of front office applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
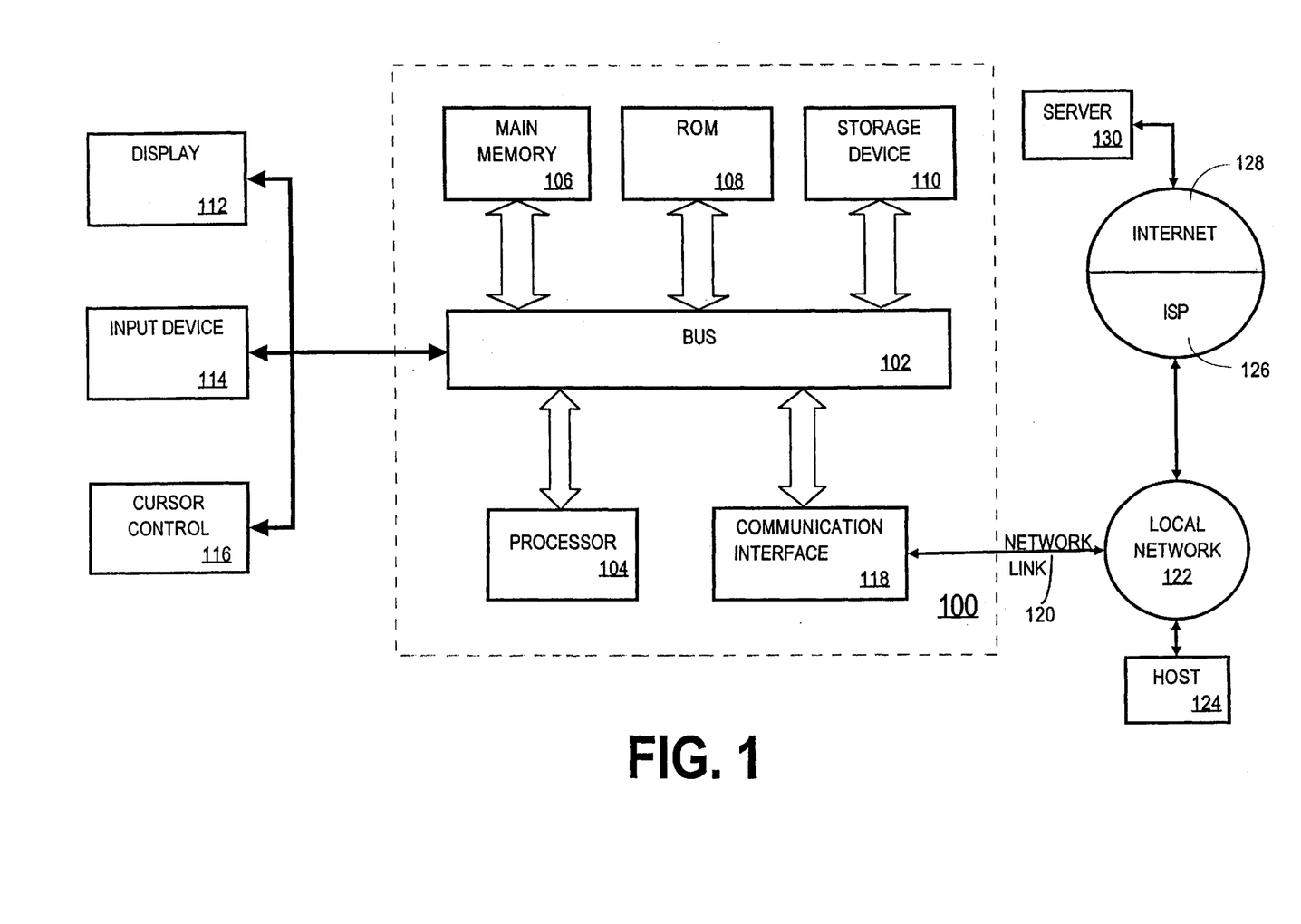
FIG. 1 depicts a computer system on which an embodiment of the present invention can be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for mass deployment of front office applications. According to one embodiment of the invention, mass deployment of front office applications is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for mass deployment of front office applications as described herein.

The received code may be executed by processor 104 as it is received, and/or stored in storage device 110, or other non-volatile storage for later execution. In this manner, computer system 100 may obtain application code in the form of a carrier wave.

Architectural Overview

Figure 2:
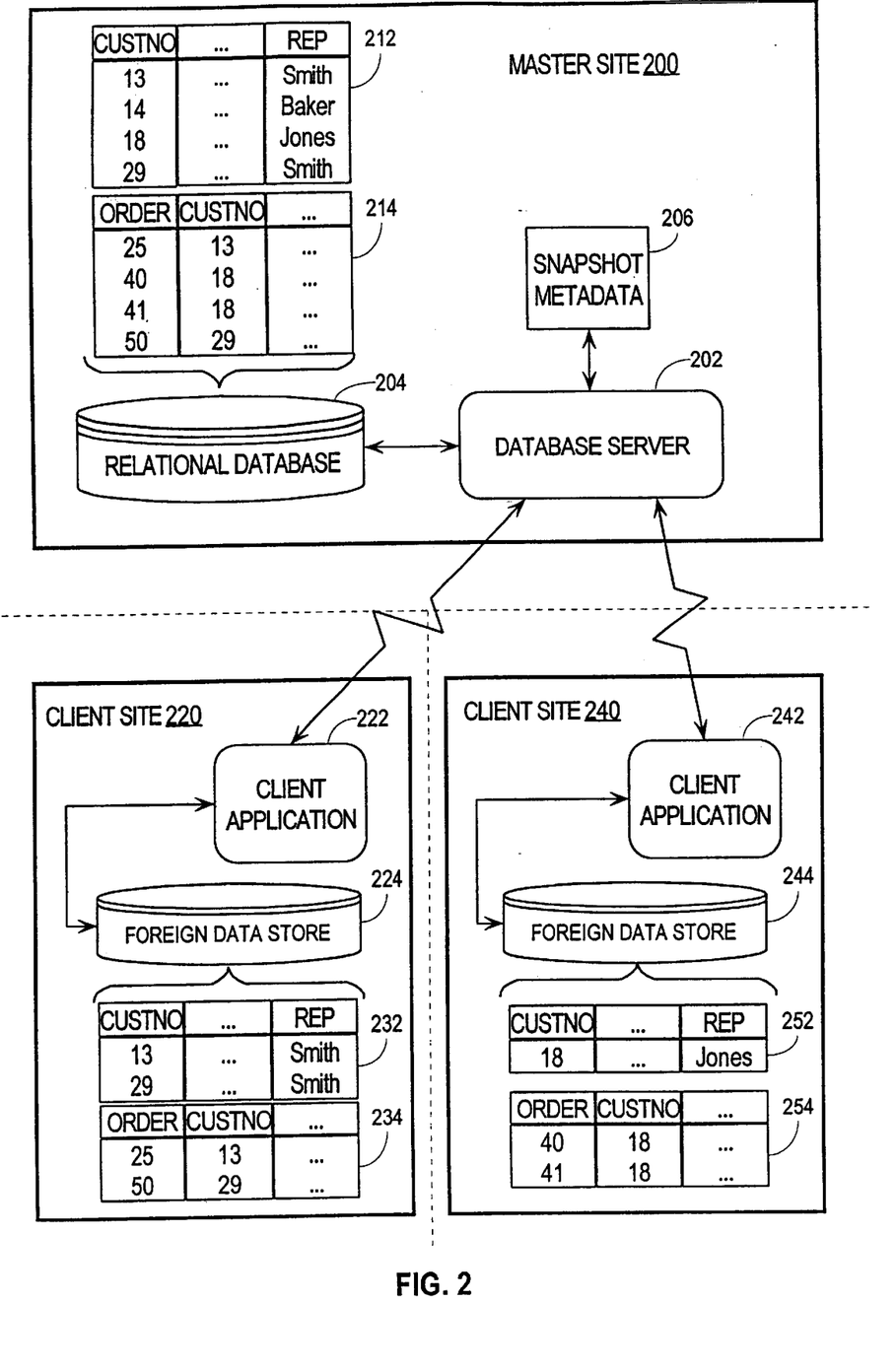
FIG. 2 is a schematic depiction of a snapshot replication environment in accordance with an embobodiment.

FIG. 2 depicts an exemplary snapshot replication environment for a company's sales department comprising a master site 200, client site 220, and client site 240. Master site 200, which may be a high-performance computer system at the company's headquarters, includes a relational database server 202 that is responsible for storing and retrieving data from a relational database 204. In this example, relational database 204 contains a customers master table 212 and an orders master table 214. The customers master table 212 is illustrative of the data stored in rows for each customer of the company and includes columns for the customer number CUSTNO and the sales representative REP to whom the customer is assigned. For example, customers 13 and 29 is assigned to sales representative Smith, and customer 18 is assigned to sales representative Jones. The orders master 214 illustrates the data stored in rows for each order that a customer makes and includes a column ORDER that indicates the number of the order and a CUSTNO column that is correlated to the customer in the customer masters table 212. For example, order 25 was placed by customer 13, and orders 40 and 41 were placed by customer 18.

In the illustrated embodiment, client site 220 and client site 240 are laptops that are temporarily connected to the master site 200 by a dial up line or the like, and belong to sales representatives Smith and Jones, respectively. In a front office automation environment, it is desirable for Smith to have a copy of Smith's customer information and a copy of the corresponding order information for those customers at Smith's laptop, i.e. client site 220, and for Jones to have a copy of Jones's customer and order information at Jones's laptop, i.e. client site 240.

Accordingly, client site 220 includes a front office client application 222, for example a thin application implemented in JAVA™, that manages a foreign data store 224 that contains snapshots of the customer master table 212 and the order master table 214 as customer snapshot 232 and order snapshot 234, respectively. Foreign data store 224 need not be a relational database and may be implemented by less sophisticated means. Since Smith is presumably only interested in Smith's own data, the customer snapshot 232 and order snapshot 234 only keep a subset of the data in the customer master table 212 and the order master table 214, respectively. Specifically, customer snapshot 232 contains the rows for Smith's customers and order snapshot 234 contains the corresponding order information. For example, customer snapshot 232 contains two rows for customers 13 and 29, and rows for orders 25 and 50 are kept in order snapshot 234. The information required to maintain and drive the refreshes for the local snapshots 232, 234, such as the defining queries for the snapshots 232, 234 and the latest refresh times, however, is kept at the master site 200 in snapshot metadata 206, although client site 220 maintains some metadata (not shown) identifying which snapshots are instantiated there, the refresh groups to which they belong, and the columns and column groups of each snapshot. Refresh groups and column groups are described in greater detail hereinafter. 1421 Similarly, client site 240 includes a front office client application 242, such as a thin application implemented in JAVA™, that manages a foreign data store 244 that containing snapshots of the customer master table 212 and the order master table 214 as customer snapshot 252 and order snapshot 254, respectively. Foreign data store 244 need not be a relational database and may be implemented by less sophisticated means. Since Jones is only properly interested in Jones's own data, the customer snapshot 252 and order snapshot 254 only keep a subset of the data in the customer master table 212 and the order master table 214, respectively. Specifically, the customer snapshot 252 contains a row for Jones's customers (e.g. customer 18) and the order snapshot 254 contains the corresponding order information (e.g. orders 40 and 41). The information required to maintain and drive the refreshes for the local snapshots, such as the defining queries for the snapshots and the latest refresh times, however, is kept at the master site 200 in snapshot metadata 206, although client site 240 maintains some metadata identifying which snapshots are instantiated there, the refresh groups to which they belong, and the columns and column groups of each snapshot.

Snapshot Metadata Located at Master Site

Figure 3:
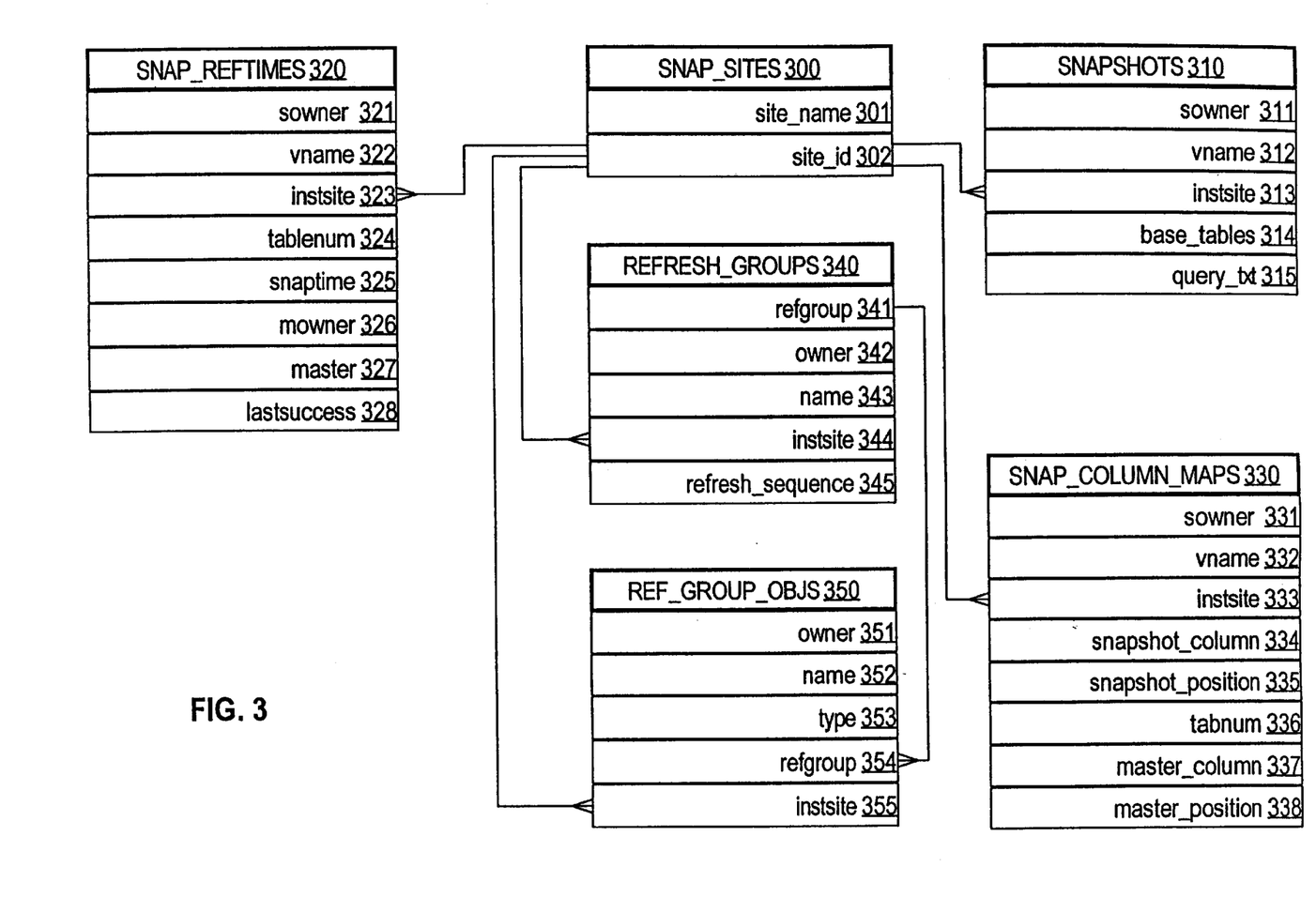
FIG. 3 illustrates snapshot metadata stored at a master site according to an embodiment.

Snapshot metadata 206 is stored at the master site 200 to support the driving of refreshes at the master site 200 of snapshots instantiated at client sites 220, 240. Some of the snapshot metadata 206 in accordance with one embodiment, is illustrated in FIG. 3 as a collection of data dictionary tables. The names for the data dictionary tables and their fields are supplied for ease of comprehension and need not reflect the actual name of any data dictionary table and their fields created at a master site 200 in any particular implementation.

Data dictionary table SNAP_SITES 300 is provided to maintain information about the various client sites at which the snapshots are instantiated. The site_name 301 of the data dictionary table SNAP_SITES 300 contains a user-friendly string for the name of the client site and must be unique within the replication environment. The site_id 302 contains a computer-friendly numeric identifier, which can be sequentially assigned and uniquely corresponds to each site_name 301. Each snapshot in this environment is identified by a key comprising the owner of the snapshot, the name of the snapshot, and the site identifier of the snapshot.

Data dictionary table SNAPSHOT 310 holds the main metadata for all the snapshots managed by the master site 200. Sowner 311 contains the name of the owner of the snapshot, vname 312 contains the name of the snapshot, and instsite 313 contains the site identifier (correlated to site_id 302) of the snapshot, thereby uniquely identifying the snapshot. An instsite 313 value of 0 identifies a server-side snapshot, as in the high-end implementation of snapshot replication. Two other pieces of metadata are illustrated in data dictionary table SNAPSHOTS 310, base_tables 314, which indicates the master tables, views, or other database objects that are used for the snapshot, and query_txt 315 containing the definition query for the snapshot.

Data dictionary table SNAP_REFTIMES 320 maintains the refresh timestamps for each master table of a snapshot. Sowner 321 contains the name of the owner of the snapshot, vname 322 contains the name of the snapshot, and instsite 323 contains the site identifier (correlated to site_id 302) of the snapshot, thereby uniquely identifying the snapshot. An instsite 323 value of 0 identifies a server-side snapshot, as in the high-end implementation of snapshot replication. Snaptime 325 identifies the last time the master table was involved in a refresh. The tablenum 324 is a numeric identifier for the master table, mowner 326 identifies the owner of the master table, and master 327 contains the name of the master table. Lastsuccess 328 indicates the last, verified successful refresh time for a snapshot.

Data dictionary table SNAP_COLUMN_MAPS 330 stores information about the aliasing of the snapshot columns with the master table columns. Sowner 331 contains the name of the owner of the snapshot, vname 332 contains the name of the snapshot, and instsite 333 contains the site identifier (correlated to site_id 302) of the snapshot, thereby uniquely identifying the snapshot. An instsite 333 value of 0 identifies a server-side snapshot, as in the high-end implementation of snapshot replication. Snapshot column 334 contains the name of the snapshot column and snapshot_position 335 identifies the position of the column in the snapshot. Likewise, for the corresponding columns of the master table (identified by tabnum 336), master_column 337 contains the name of the master column and master_position 338 identifies the position of the column in the master table.

Refresh Groups

One aspect of the invention, refresh groups, stems from the realization that a laptop user normally expects to refresh all the snapshots used by a suite of front office automation software at the same time. A refresh group is a collection of related snapshots that are refreshed at the same time. For example, the various snapshots of a front office application suite can be placed in the same refresh group, to allow them all to be refreshed at the same time.

Accordingly, snapshot metadata 206 also stores metadata to maintain refresh groups. With continued reference to FIG. 3, data dictionary table REFRESH_GROUPS 340 holds the metadata for the each refresh group defined at the master site 200. Refgroup 341 contains a number identifying the refresh group, owner 342 identifies the owner of the refresh group, and name 343 is a string storing user-friendly name of the refresh group. Instsite 344 contains an identifier (correlated to site_id 302) of the site at which the refresh group is instantiated.

Data dictionary table REF_GROUP_OBJECTS 350 tracks the objects defined for a refresh group. Each object in the refresh group, for example a snapshot, is identified by a key comprising owner 351 for the name of the owner of the snapshot, name 352 for the name of the object, and instsite 355 for the site identifier (correlated to site_id 302) of the snapshot, thereby uniquely identifying the snapshot. An instsite 355 value of 0, of course, identifies a server-side refresh group object, an improvement compatible with the high-end implementation of snapshot replication. Type 353 indicates the type of the refresh group object and defaults to "snapshot." Refgroup 354 is correlated with refgroup 341 to identify the refresh group for with the object defined.

Mass Deployment

Another aspect of the invention stems from the realization that most snapshot definition queries between different users in a front office environment are very similar to one another structurally except for values of certain literals or constants such as the name, territory, or other identification of the sales representative. For example, the snapshot definition queries for Smith's customer snapshot 232 and Smith's order snapshot 234 are similar to the snapshot definition queries for Jones's customer snapshot 252 and Jones's order snapshot 254, except that Smith's snapshot definition queries use "Smith" as the REP value and Jones's snapshot definition queries use "Jones" as the REP value. In this example, common for front office automation, each client site 220, 240 will use snapshots defined by structurally related snapshot definition queries.

Figure 4:
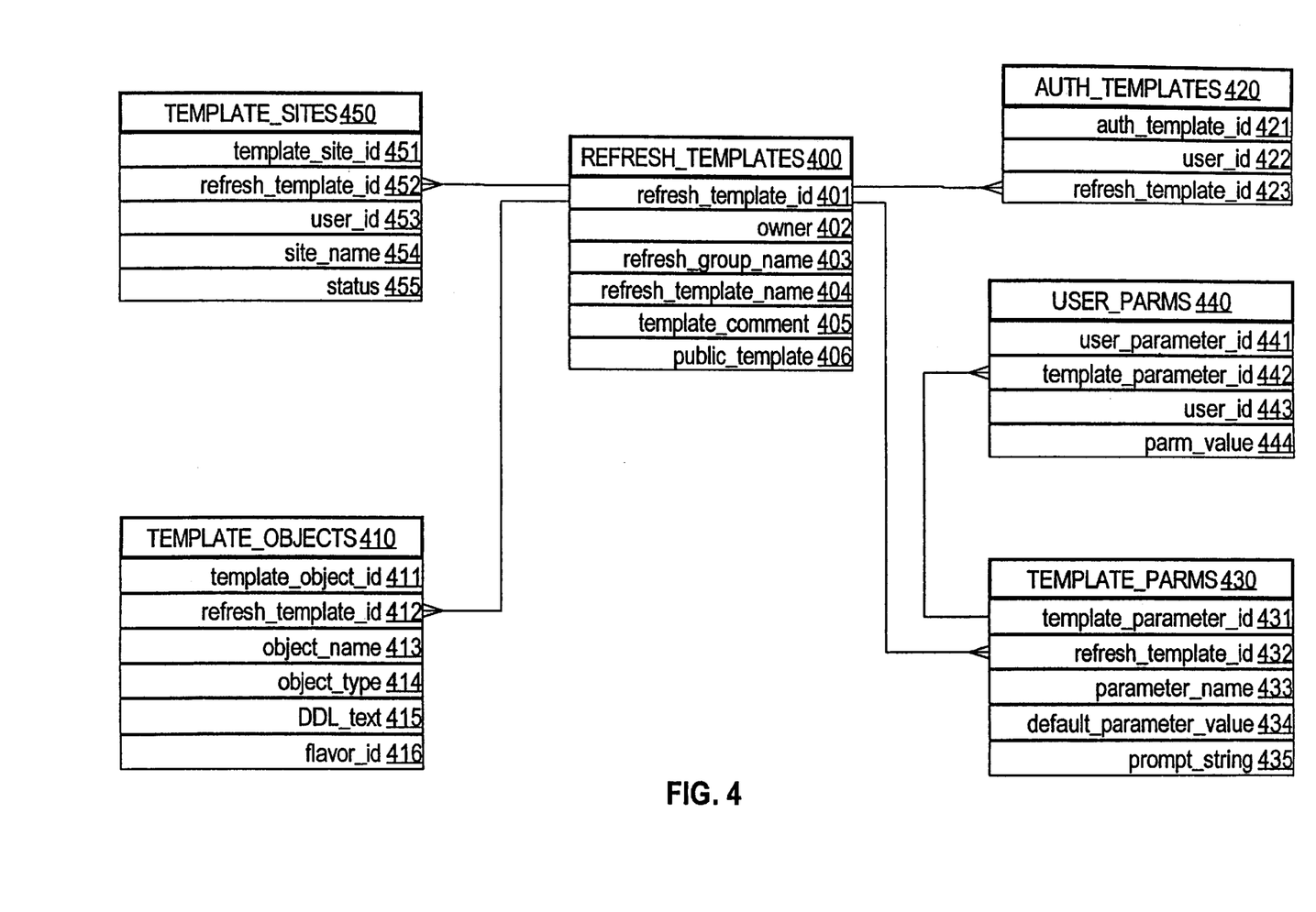
FIG. 4 illustrates metadata for refresh group templates for mass deployment of snapshots for an embodiment.

Accordingly, refresh group templates are provided to enable structurally related snapshot definition queries to be defined parametrically. That is, the basic snapshot definition query is defined once for multiple sites 220, 240 at the master site 200 and the appropriate literals are filled in for each site 220, 240. FIG. 4 illustrates the metadata (also stored among snapshot metadata 206) that supports refresh group templates according to one embodiment.

Data dictionary table REFRESH_TEMPLATES 400 is the top level data dictionary table for refresh group templates. Each refresh group template is identified by a number, refresh_template_id 401. Owner 402 names the owner of the refresh group template, and the refresh_group_name 403 and the refresh_template_name 404 contain a user-friendly name for the instantiated refresh group and the instantiating refresh group template, respectively. A template_comment 405 is also provided for documentation purposes. Public_template 406 indicates whether anyone can instantiate the current refresh group template (if public) or whether only specific authorized users are allowed to the instantiate the current refresh group template (if private).

Data dictionary table TEMPLATE_OBJECTS 410 specifies the database objects in a refresh group template. Template_object_id 411 is a key to identify the various database objects specified in the refresh group templates, and refresh_template_id 412 correlates the template object to a specific refresh group template. The user-friendly string name of the template object is given by object_name 413, and the type of the object by object_type 414, for example, "snapshot." The DDL_text 415 contains a parameterized Data Definition Language (DDL) string that defines how to create the template object and may contain parameters for use with parameter substitution. In one embodiment, when entries are added to this data dictionary table, the DDL_text 415 is examined for parameters (identified, for example, by inspecting the string for an identifier beginning with a prefix such as a colon ":") and corresponding entries are automatically inserted into the data dictionary table TEMPLATE_PARMS 430, which is described hereinafter.

In the example illustrated in FIG. 2, a DDL string that defines the customer snapshots 232, 252 would be "create snapshot customers as select * from customers@master where rep=:rep_id;" and a DDL string that defines the order snapshots 234, 254 would be "create snapshot orders as select * from orders@master o where exists (select custno from customers@master c where c.custno=o.custno and rep=:rep_id);" wherein ":rep_id" given by a colon prefix is the parameter to be substituted for a specific sales representative.

The flavor of the object group that the refresh group template belongs to is given by flavor_id 416. An object group is a collection of related master tables and other database objects, generally to maintain consistency for master-to-master replications. Object groups within the context of master-to-master replication are described in more detail in the commonly assigned U.S. Pat. No. 5,799,306 entitled "Method and apparatus for facilitating data replication using object groups" issued Aug. 25, 1998 to Harry Sun et al., whose entire contents is hereby incorporated by reference herein. A flavor of an object group specifies a subset of the objects in the object group and a subset of the columns of each table or index in the object group, including all primary key columns. Thus, two sites instantiated with different flavors of an object group may hold different subsets of the objects in the object group, and the table they hold in common have may different sets of columns.

Data dictionary table AUTH_TEMPLATES 420 is used to track authorizations of private refresh group templates. Each authorization is identified by the auth_template_id 421 key and contains a user_id 422 and a refresh_template_id 423. Thus, when a user attempts to instantiate a private refresh group template, the user's id is compared with the user_id 422 for the entries having a refresh_template_id 423 that identifies the private refresh group template.

Data dictionary table TEMPLATE_PARMS 430 contains the parameters used in a refresh group template. Each template parameter, which is identified by a unique template_parameter_id 431 key, specifies the refresh_template_id 432 to identify the refresh group template, the parameter_name 433 for the name of the template parameter, a default_parameter_value 434 to hold a default value for the template parameter, and prompt_string 435 for interactively obtaining the value of a template parameter from a user. In one embodiment, the data dictionary table TEMPLATE_PARMS 430 is automatically populatated when a DDL_text 415 is added to the data dictionary table TEMPLATE_OBJECTS 410. In the example, data dictionary table TEMPLATE_PARMS 430 would be automatically populated with an entry for the ":rep_id" template parameter.

Data dictionary table USER_PARMS 440 contains parameter values for a user identified by the user_id 443. Each entry in the data dictionary table USER_PARMS 440, keyed by the user_parameter_id 441, specifies a template_parameter_id 442 (correlated to template_parameter_id 431), the user_id 443, and the parm_value 444, for example, "Smith" or "Jones." Thus, if the entire sales forces is entered into the data dictionary table USER_PARMS 440, then refresh groups for each sales representative can be instantiated with little intervention by a database administrator other than starting off the process.

Data dictionary table TEMPLATE_SITES 450 tracks the installation and deletion of refresh group templates at the various sites in a distributed database system. This data dictionary table is provided to aid a database administrator in the ongoing maintenance of refresh group templates instantiated across a number of sites. In one embodiment, each entry contains a template_site_id 451 to identify each entry herein, a refresh_template_id 452 to identify the refresh group template that was instantiated, a user_id 453 to identify the user who instantiated the refresh group template, the site_name 454 to identify the site at which the right was instantiated, and a status 455.

After storing parameterized DDL texts for creating the various objects of a refresh group in data dictionary table TEMPLATE_OBJECTS 410 and the desired values for the template parameters in data dictionary table USER_PARMS 440, the master database server 202 can loop through the template objects for each user, substitute the parameters, and create all the various snapshots for a suite of front office automation applications.

Figure 5:
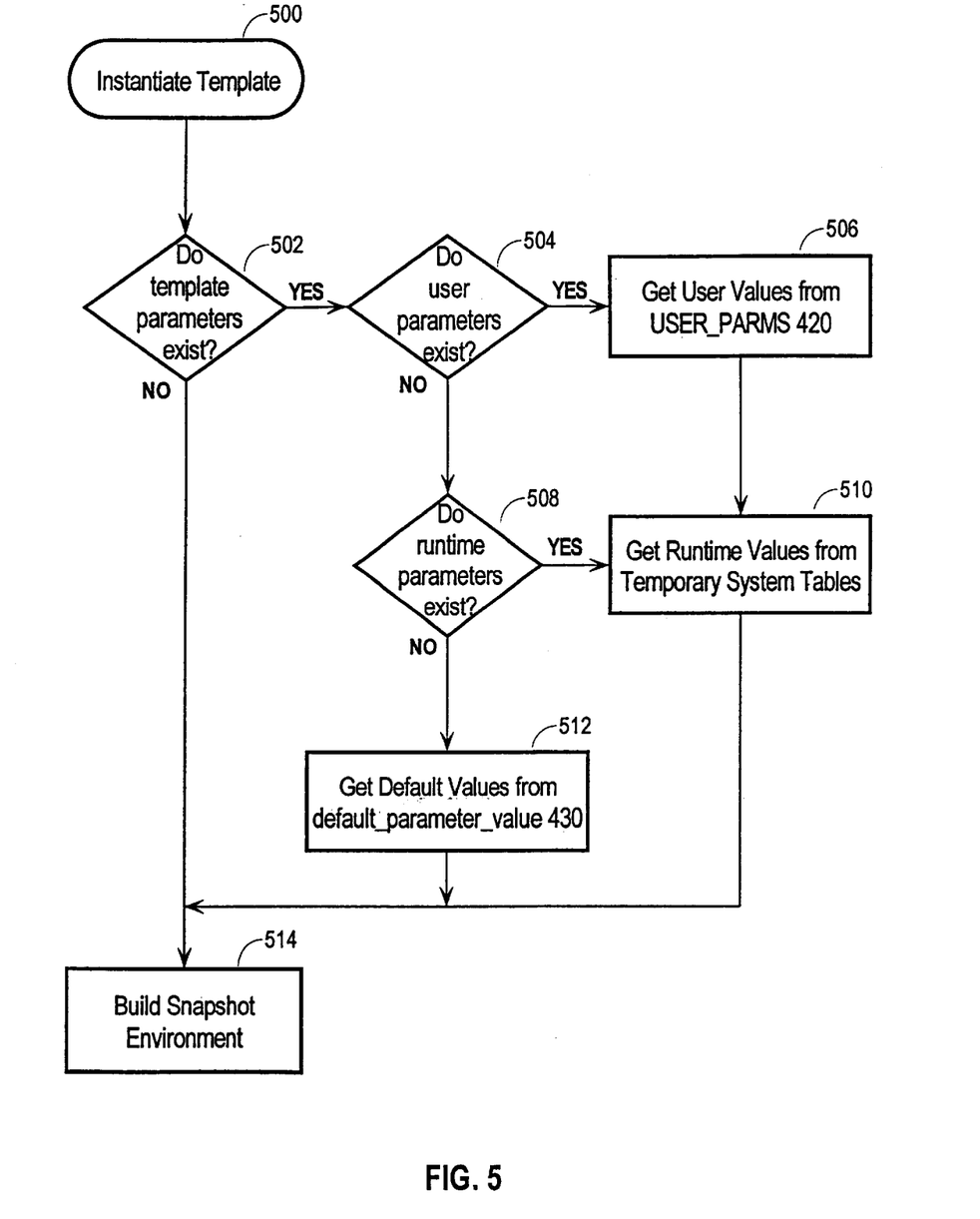
FIG. 5 is a flowchart for expanding refresh group templates.

More specifically, FIG. 5 shows one way in which parameter substitution is performed. At step 500, a user, such as database administrator, requests to instantiate a template by giving the refresh_template_id 401 of the desired template. In response, the master database server 202 accesses the data dictionary table TEMPLATE_OBJECTS 410, selecting those rows with the refresh_template_id 401, to ascertain which objects, described by the DDL_text 415, should be built. At step 502, the DDL_text 415 is checked to determine whether it contains template parameters (e.g. that are identified by a colon ':' prefix) and by fetching the template_parameter_id 431 from the data dictionary table TEMPLATE-PARMS 430 based on the refresh template and the parameter name. If there are no template parameters, then the template is built from the DDL_text 415 as is (step 514).

On the other hand, if template parameters are found in the DDL_text 415, then template parameters are expanded in the following order of priority: user-specific parameter values (step 504), run-time parameter value (step 508), and default values. User-specific parameter values are fetched from the data dictionary table USER_PARMS 440 by using the template_parameter_id 442 to look up the parm_value 444 for the appropriate user (e.g. the owner), given by the user_id 443 (step 506). Run-time parameter values, entered by prompting the user and cached in a temporary system user, are substituted in step 510. Default parameter values are obtained from default_parameter_value 434 if no values were specified in the data dictionary table USER_PARMS 440 or entered at run-time (step 512).

Once the parameter values have been obtained, their values are substituted into the DDL_text 415 to build the snapshot environment in a temporary table (step 514). By providing for substitution of parameters for the DDL text of snapshots and other objects and by providing for a mechanism that collects many related snapshots and other objects into a manageable refresh group, ease of mass deployment of front office applications for thousands of sales representatives in a sales force is greatly improved from the perspective of the database administrator.

Off-line Instantiation

According to another aspect of the invention, a laptop does not even need to be connected to the master site 200 to instantiate a refresh group of one or more snapshots on the laptop, because the information to instantiate the refresh group at the laptop is provided on a transportable computer-readable medium in import/export. The computer-readable medium, such as a floppy disk, magnetic tape cartridge, a CD-ROM and the like, is applied to the laptop (as by inserting a CD-ROM into a CD-ROM drive). Executing an import operation causes the refresh group to be imported from the computer-readable medium to the main storage of the laptop.

Figure 6:
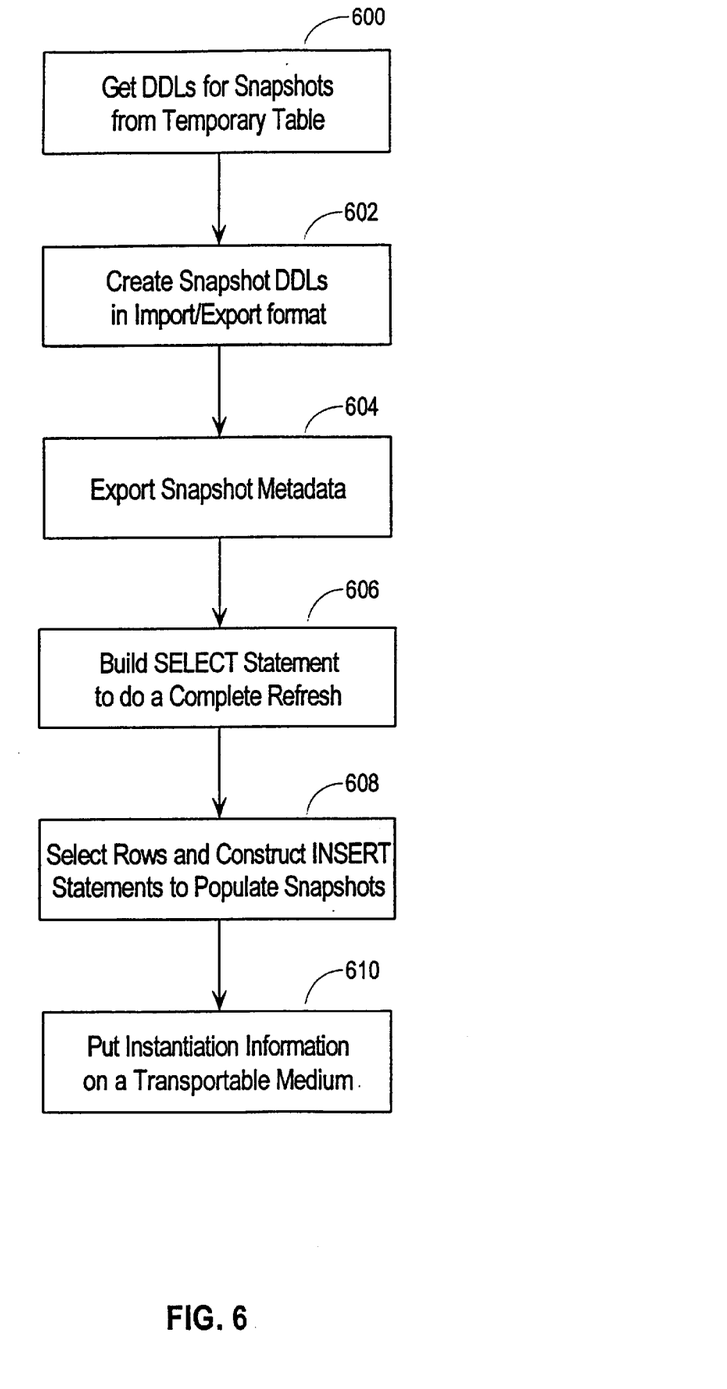
FIG. 6 is a flowchart for off-line instantiation of refresh groups for mass deployment of snapshots in accordance with one embodiment.

Referring to FIG. 6, which illustrates how a computer-readable medium for off-line instantiation is created, the DDLs for the snapshot are obtained in step 600 from a temporary table (whose lifetime is that of a database session) that was filled by looping through the refresh group template metadata as described hereinabove. In step 602, the snapshot DDLs are created in import/export format, and, in step 604, the metadata for the snapshot is exported. Since each snapshot is fully populated for off-line instantiation of refresh groups, a SQL select statement is built to do a complete refresh (step 606). This select statement is used to select rows from the master table(s) to construct SQL insert statements that populate the snapshots with the appropriate data (step 608). Finally, this generated instantiation information is placed on a transportable, computer-readable medium, such as by "burning" a CD-ROM, or copying the information to a high-capacity magnetic disk (step 610).

Alternatively, when the client application 222 does not employ SQL or full relational database technology, the snapshot data is converted into a format used by the client application 222 before being placed on the transportable computer-readable medium. For example, if the client application 222 is a JAVA™ application, then the snapshot data is converted into corresponding JAVA™ objects and serialized. Importing the snapshot data at the client site 220 from such a transportable computer-readable medium merely requires deserialization of the serialized JAVA™ objects.

Therefore, a refresh group of snapshots for an entire suite of front office applications can be instantiated on a laptop without the intervention of an experienced database administrator (since running a script to import database objects from a computer-readable medium is administratively straightforward) or maintaining a network connection between the laptop and the master site 200 during the entire instantiation process.

While the present invention has been described in connection with a number of embodiments and implementations, the present invention is not so limited but covers various obvious modifications and equivalent arrangements, which fall within the purview of the appended claims.

What is claimed is:

1. A method of deploying a database object, comprising the steps of:
   storing a Data Description Language (DDL) string that describes how to instantiate the database object;
   inspecting the DDL string to determine if the string contains a substitutable parameter; and
   if the DDL string contains a substitutable parameter then performing the steps of:
      obtaining a value for the substitutable parameter; and
      substituting the value for the substitutable parameter to produce a DDL text, which, when executed, causes the database object to be instantiated.

2. The method of claim 1, wherein the step of obtaining a value for the substitutable parameter includes the step of obtaining the value for the substitutable parameter based on an identity of an owner of a snapshot.

3. The method of claim 1, wherein the step of obtaining a value for the substitutable parameter includes the step of prompting a user for the value.

4. The method of claim 1, further comprising the steps of:
   storing a default value for the parameter;
   wherein the step of obtaining a value for the substitutable parameter includes the step of fetching the default value.

5. The method of claim 1, further comprising the step of executing the DDL text to instantiate a snapshot of a body of data.

6. A computer-readable medium bearing instructions for deploying a database object, said instructions arranged, when executed by one or more processors, to cause the one or more processors to perform the steps recited in claim 1.

7. The method of claim 1, wherein the step of substituting the value for the substitutable parameter to produce the DDL text includes substituting within the DDL string the value for the substitutable parameter to produce the DDL text.

8. A method of deploying a database object, comprising the steps of:

storing a string that describes how to instantiate the database object;

inspecting the string to determine if the string contains a substitutable parameter; and if the string contains a substitutable parameter then performing the steps of:

obtaining a value for the substitutable parameter; and substituting the value for the substitutable parameter to produce snapshot data corresponding to the database object to be instantiated; and formatting the snapshot data in a format used by a client application.

9. The method of claim 8, wherein the step of obtaining a value for the substitutable parameter includes the step of prompting a user for the value.

10. The method of claim 8, further comprising the steps of:

storing a default value for the parameter;

wherein the step of obtaining a value for the substitutable parameter includes the step of fetching the default value.

11. The method of claim 8, further comprising the step of converting the formatted snapshot data to instantiate a snapshot of a body of data.

12. A computer-readable medium bearing instructions for deploying a database object, said instructions arranged, when executed by one or more processors, to cause the one or more processors to perform the steps recited in claim 8.

13. The method of claim 8, wherein the step of substituting the value for the substitutable parameter to produce the snapshot data includes substituting within the string the value for the substitutable parameter to produce the snapshot data.

14. The method of claim 8, wherein the step of obtaining a value for the substitutable parameter includes the step of obtaining the value for the substitutable parameter based on an identity of an owner of the snapshot.

* * * * *

UNITED STATES PATENT AND TRADEMARK OFFICE
CERTIFICATE OF CORRECTION

PATENT NO. : 6,697,804 B1  Page 1 of 1
DATED : February 24, 2004
INVENTOR(S) : Elsbernd et al.

It is certified that error appears in the above-identified patent and that said Letters Patent is hereby corrected as shown below:

<u>Title page,</u>
Item [54], Title, change "DEPLOYING PLURALITY OF SANPSHOTS STORING PARAMETERIZED DATA DESCRIPTION LANGUAGE STRINGS WITH SUBSTITUTABLE PARAMETER CAUSES DATABASE OBJECT TO INSTANTIATED" to -- DEPLOYING PLURALITY OF SNAPSHOTS STORING PARAMETERIZED DATA DESCRIPTION LANGUAGE STRINGS WITH SUBSTITUTABLE PARAMETER CAUSING DATABASE OBJECT TO BE INSTANTIATED --.

Signed and Sealed this

Twenty-sixth Day of October, 2004

JON W. DUDAS
*Director of the United States Patent and Trademark Office*